United States Patent [19]
Firmin

[11] Patent Number: 6,115,956
[45] Date of Patent: Sep. 12, 2000

[54] HONEYCOMBED FISH LURE

[75] Inventor: Herman P. Firmin, Baton Rouge, La.

[73] Assignee: Uncle Josh Bait Company, Fort Atkinson, Wis.

[21] Appl. No.: 09/347,967

[22] Filed: Jul. 6, 1999

[51] Int. Cl.[7] .............................................. A01K 85/00
[52] U.S. Cl. .................................... 43/42.06; 43/42.24
[58] Field of Search ........................... 43/42.06, 42.24, 43/42.28, 42.29, 42.32, 42.34; D22/127

[56] References Cited

U.S. PATENT DOCUMENTS

| | | | |
|---|---|---|---|
| 2,566,612 | 9/1951 | Hearne | 43/44.9 |
| 3,040,465 | 6/1962 | Gierat | 43/42.06 |
| 3,108,389 | 10/1963 | McGuire | 43/42.06 |
| 3,979,853 | 9/1976 | Storm et al. | 43/42.29 |
| 3,983,656 | 10/1976 | Bain | 43/42.24 |
| 3,991,504 | 11/1976 | Pieper | 43/42.06 |
| 3,992,800 | 11/1976 | Neil | 43/42.24 |
| 4,069,609 | 1/1978 | Demy | 43/42.06 |
| 4,069,610 | 1/1978 | Firmin | 43/42.24 |
| 4,074,455 | 2/1978 | Williams, Jr. | 43/42.06 |
| 4,102,075 | 7/1978 | Wagner et al. | 43/42.06 |
| 4,197,667 | 4/1980 | Helfenstein et al. | 43/42.06 |
| 4,214,397 | 7/1980 | Kent | 43/42.28 |
| 4,231,179 | 11/1980 | Hillesland | 43/42.06 |
| 4,530,179 | 7/1985 | Larew | 43/42.06 |
| 4,553,348 | 11/1985 | Cooper | 43/42.06 |
| 4,603,502 | 8/1986 | MacDonald | 43/42.06 |
| 4,648,198 | 3/1987 | Sauve | 43/42.06 |
| 4,672,768 | 6/1987 | Pippert | 43/42.24 |
| 4,709,501 | 12/1987 | Garst | 43/42.24 |
| 4,881,340 | 11/1989 | Davis | 43/42.06 |
| 4,922,646 | 5/1990 | Basgal | 43/42.33 |
| 4,953,319 | 9/1990 | Kasper et al. | 43/42.06 |
| 5,097,620 | 3/1992 | Nietupski | 43/42.06 |
| 5,170,580 | 12/1992 | Rosenblatt | 43/42.06 |
| 5,333,405 | 8/1994 | Bowles | 43/42.06 |
| 5,517,781 | 5/1996 | Paoletta, Jr. | 43/42.06 |
| 5,689,910 | 11/1997 | Kato | 43/42.24 |
| 5,894,692 | 4/1999 | Firmin | 43/42.24 |
| 5,943,811 | 8/1999 | Packer | 43/42.24 |
| 5,996,271 | 12/1999 | Packer | 43/42.24 |

*Primary Examiner*—Michael J. Carone
*Assistant Examiner*—Darren W. Ark
*Attorney, Agent, or Firm*—Quarles & Brady LLP

[57] ABSTRACT

The present invention provides a lure that provides a unique combination of a bubble action, undulating motion, light reflection, and scent dispensing potential, for attracting fish. The lure is characterized by an elongate, generally cylindrical body having a head at one end and a tail at an opposite longitudinal end. There is also a honeycomb structure longitudinally arrayed along the body between the ends. The honeycomb structure has a central elongated longitudinal bore connected to a series of radially directed honeycomb channels that extend to the radial periphery of the body. The lure is designed so that when it is dragged through water the water can pass radially inward through a honeycomb channel and tailward along the longitudinal bore.

10 Claims, 2 Drawing Sheets

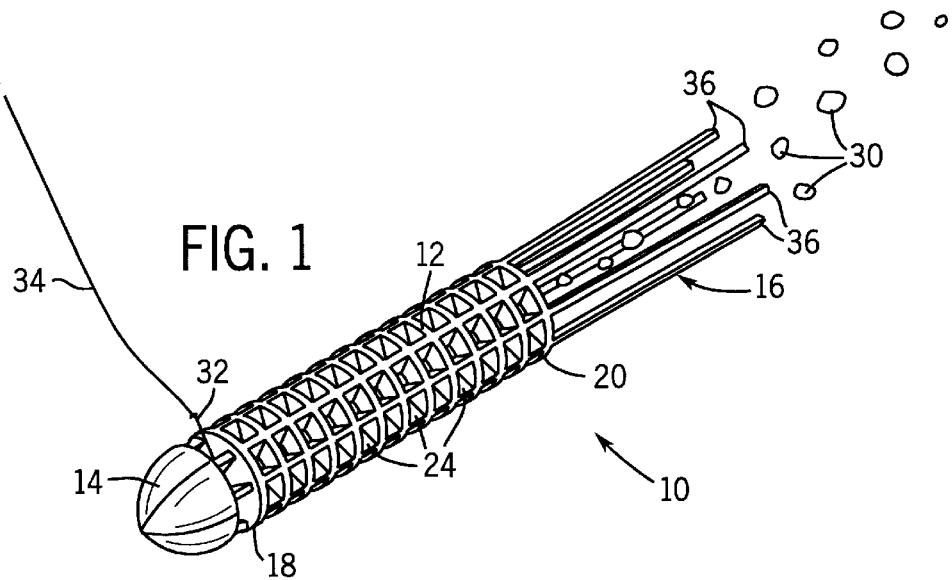
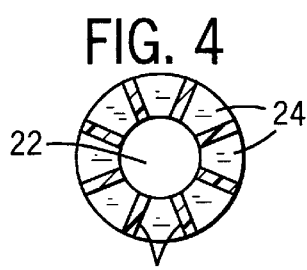
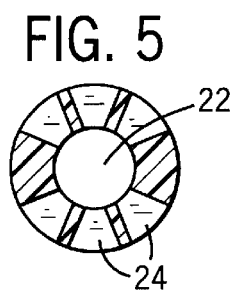
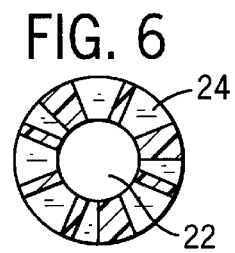
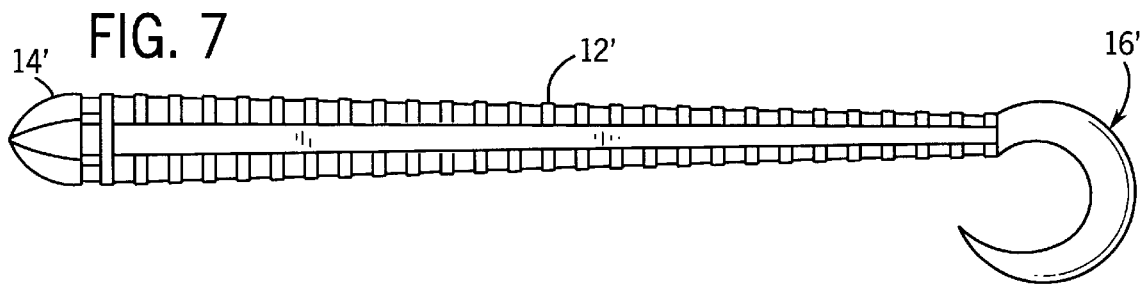

HONEYCOMBED FISH LURE

CROSS REFERENCES TO RELATED APPLICATIONS

Not Applicable

STATEMENT REGARDING FEDERALLY SPONSORED RESEARCH

Not Applicable

BACKGROUND OF THE INVENTION

The invention relates to fishing lures. More particularly, it relates artificial fishing lures that provide a unique action in the water that is attractive to fish as well as provide the opportunity to efficiently dispense an odor adjacent the lure.

Significant efforts have been expended to provide equipment that will facilitate the ability of sport fisherman to catch fish using artificial fishing lures. Early attempts at simulating or improving on live bait took the form of shaping a piece of wood or other material into a shape resembling live bait. The unnatural movement of such lures in the water was a significant disadvantage.

With the development of plastic compositions and injection molding techniques lures were produced that more closely simulated live bait shapes and their movements. Still other lures sought to improve on live baits by providing unique water actions or appearances that were particularly attractive to fish. See e.g. U.S. Pat. Nos. 5,689,910, 5,517,781, 4,922,646, 4,881,340, 4,214,397, 3,992,800 and 3,983,656. While each of these lures had their own advantages, and some provided light reflecting, scent dispensing, and/or water action characteristics of interest, each was deficient in at least one of these areas with respect to certain target fish.

Thus, a desire remains to develop still further lures having unique presentations.

BRIEF SUMMARY OF THE INVENTION

The present invention provides fishing lure having an elongated, generally cylindrical body portion having a head at one end and a tail at an opposite longitudinal end. There is a honeycomb structure longitudinally arrayed along the body between the ends. By honeycomb structure I mean a structure that has a central elongated longitudinal bore connected to a series of radially directed honeycomb channels that extend to the radial periphery of the body (regardless of the cross sectional shape of the honeycomb channels or longitudinal bore). Preferred cross sections are square, rectangular, round, or polygonal cross sections.

The lure is designed so that when it is dragged through water, the water can pass radially inward through a honeycomb channel and then tailward along the longitudinal bore. In some configurations some of the water can then bubble out a more tailward honeycomb channel. In others, some of the water can pass in a turbulent manner out a rear exit of the lure.

In one form the tail can be a plurality of elongated streamers forming a skirt. In another form it can be a sickle.

It will be appreciated that the honeycomb channels and bore are configured such that when the lure is dragged through water bubbles and/or turbulence will be created behind the lure in the water by the lure. Further, the lure will have an exciting action. Moreover, the many surfaces of the honeycomb provide interesting light reflecting surfaces of interest to fish. Also, when the lure is impregnated with scent the turbulent action of the flow through the honeycomb assists in dispensing the scent.

A primary object of the invention is to provide a lure with multiple-attractive aspects (light; turbulence; scent; undulation) when pulled through the water.

Another object of the present invention is to provide fishing lure that is easy to manufacture and is easy to use.

The foregoing and other objects and advantages of the present invention will be apparent from the description which follows. In the description reference is made to the accompanying drawings which form a part hereof, and in which there is shown by way of illustration preferred embodiments of the invention. However, it is to be understood that the invention is broader than merely the preferred embodiment.

BRIEF DESCRIPTION OF THE DRAWINGS

FIG. 1 is a perspective view of a fishing lure that incorporates the present invention;

FIG. 4 is a transverse cross sectional view thereof taken along line 4—4 of FIG. 2;

FIG. 5 is a transverse cross sectional view similar to FIG. 4, albeit of a second embodiment having some of its honeycomb channels completely plugged;

FIG. 6 is a transverse-cross sectional view similar to FIG. 4, albeit of a third embodiment having some of its honeycomb channels partially plugged; and FIG. 7 is a view similar to FIG. 3, albeit of a fourth embodiment having a more worm-like body and sickle tail.

DETAILED DESCRIPTION OF THE PREFERRED EMBODIMENTS

Figure 2:
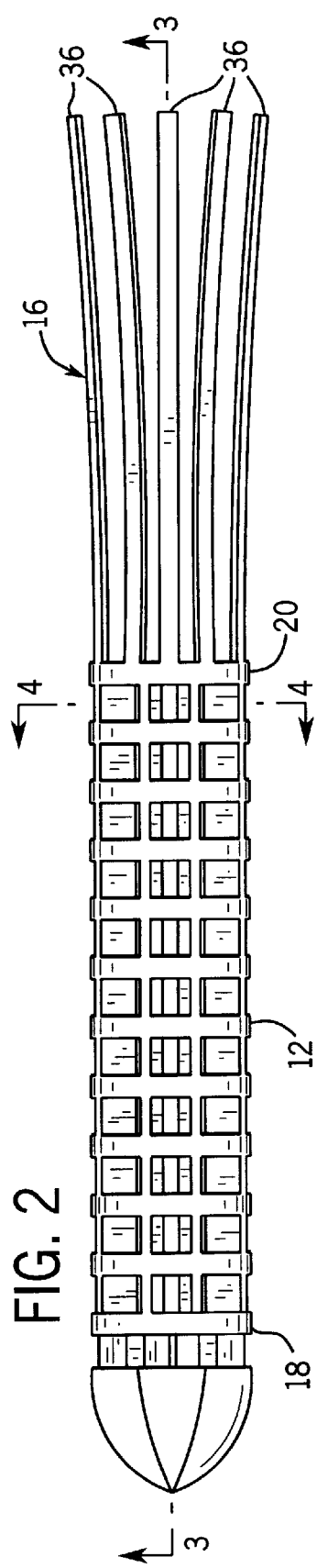
FIG. 2 is a side elevational view of the FIG. 1 fishing lure.
Figure 3:
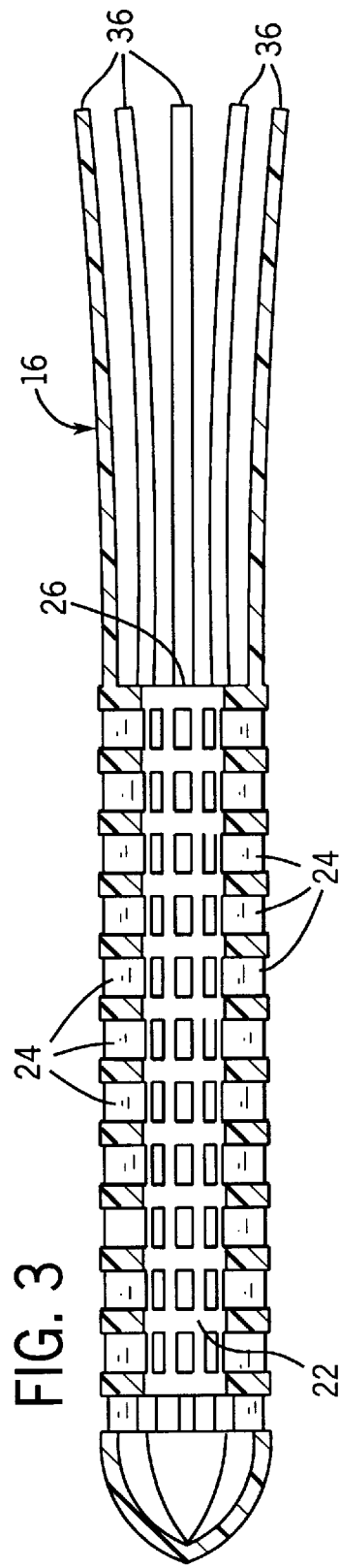
FIG. 3 is a longitudinal cross sectional view thereof taken along line 3—3 of FIG. 2.

Shown in FIGS. 1–3 is a fishing lure (generally 10) including an elongated honeycomb body 12 having a head 14 at end 18 and a tail 16 at an opposite 20. The lure 10 is formed from a flexible vinyl plastic material, such as a vinyl plastisol (polyvinyl chloride) dispersion grade resin in a suitable solvent or plasticizer. The plastic material can be non-transparent, or partially transparent, or completely transparent. It is preferred that the plastic material be essentially non-transparent for most fish targets. Techniques for forming plastisol lures of other shapes are generally described in U.S. Pat. No. 4,530,179. Fragrances, such as cod liver oil, fish oil, and the like, may be added to the plastic material to attract fish.

The water flowing radially into the bore 22 through the channels 24 exits the body 12 in bubbles 30. In addition, water having increased turbulence exits the bore 22 at the body tail end 20 to attract fish.

Referring next to FIGS. 2–4, the body 12 has a honeycomb structure longitudinally arrayed along it. The honeycomb structure requires less material than a solid cylindrical lure, and even more importantly provides a more flexible body for any given type of plastic. Thus, the honeycomb structure allows the use of a more durable plastic to prolong the useful life of the lure 10.

The honeycomb structure 12 is formed with a central elongated bore 22 and radially directed channels 24 extending therefrom. As best seen in FIGS. 5 and 6, in order to precisely control the rigidity of various parts of the body 12, one or more of the channels 24 may be solid or covered (e.g. 15–20% covered).

The elongated bore 22 extends along the length of the body 12 and receives water passing through the channels 24. At least a portion of the water entering the bore 22 exits through an open bore rearward end 26. This creates a suction drawing even more water into the bore 22 through the channels 24.

Channels 24 provide passageways for water to flow into the bore 22 as the lure 10 is pulled through the water. Preferably each channel 24 has a polygonal cross section to provide a plurality of reflective surfaces 28 which attract fish. Although a polygonal cross section, such as square, rectangular, pentagonal, hexagonal, and the like, is preferred, any other shape, such as a round, oval or the like, may be used without departing from the scope of the present invention.

The bullet shaped head 14 is formed as an integral part of the body 12 at end 18. A conventional hook 32 on a fishing line 34 thrust through the head 18 attaches the lure 10 to the line 34. Alternatively, the hook 32 may be molded into the head 14 to minimize damage to the lure 10 by an improperly set hook.

As shown in FIGS. 1–3, the tail 16 can be a plurality of streamers 36. The streamers 36 further increase the turbulence of the water exiting the bore 22, and simulate the look of live bait.

In the alternative embodiment shown in FIG. 7, the tail 16' has a sickle shape. Tail 16' is formed as an integral part of a body 12' having a honeycomb structure and a head 14'.

What has been described above are merely the preferred embodiments of the invention. Various changes and modifications can be made therein without departing from the scope of the invention defined by the appended claims.

I claim:

1. A flexible fishing lure, comprising:

an elongate, generally cylindrical body portion having a head at one end and a tail at an opposite longitudinal end;

a honeycomb structure longitudinally arrayed along the body portion between the ends, the honeycomb structure having a central elongated longitudinal bore that has a closed forward end, a tailwardly directed outlet opening at a rear of the bore and a series of radially directed honeycomb channels that extend from the bore to the radial periphery of the body;

whereby the lure is configured so that when it is dragged through water the water can pass radially inward through a honeycomb channel, then tailward along the longitudinal bore, and then out the bore outlet along the tail.

2. A fishing lure as in claim 1, wherein said lure is formed from a plastic.

3. A fishing lure as in claim 2, wherein said plastic is polyvinyl chloride.

4. A fishing lure as in claim 1, wherein the tail is in the form of a plurality of elongated streamers.

5. A fishing lure as in claim 1, wherein the tail is in the form of a sickle.

6. A fishing lure as in claim 1, wherein said head is a solid mass suitable to receive a fish hook.

7. A fishing lure as in claim 1, wherein said lure is scented with a fragrance.

8. A fishing lure as in claim 1, wherein at least one of said honeycomb channels has a cross section selected from the group consisting of square, rectangular, round, or polygonal.

9. A fishing lure as in claim 1, wherein said honeycomb channels and bore are configured such that when the lure is dragged through water bubbles will be created behind the lure in the water by the lure.

10. A fishing lure as in claim 1, wherein the honeycomb channels are provided both around the circumference of the body and longitudinally along the body.

* * * * *